US008090142B2

(12) United States Patent
Tewfik et al.

(10) Patent No.: US 8,090,142 B2
(45) Date of Patent: Jan. 3, 2012

(54) EMBEDDING DATA IN AND DETECTING EMBEDDED DATA FROM VIDEO OBJECTS

(75) Inventors: Ahmed Tewfik, Edina, MN (US); Bin Zhu, Beijing (CN); Mitch Swanson, Eden Prairie, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 850 days.

(21) Appl. No.: 11/926,942

(22) Filed: Oct. 29, 2007

(65) Prior Publication Data
US 2008/0219496 A1 Sep. 11, 2008

Related U.S. Application Data

(63) Continuation-in-part of application No. 10/360,794, filed on Apr. 30, 2001, now Pat. No. 7,366,908, which is a continuation-in-part of application No. 08/921,931, filed on Aug. 27, 1997, now Pat. No. 6,226,387, said application No. 10/360,794 is a continuation-in-part of application No. 08/918,126, filed on Aug. 27, 1997, now Pat. No. 6,272,634, which is a continuation-in-part of application No. 08/918,125, filed on Aug. 27, 1997, now Pat. No. 6,282,299.

(60) Provisional application No. 60/050,587, filed on Jun. 24, 1997.

(51) Int. Cl.
*H04K 1/00* (2006.01)

(52) U.S. Cl. ........................................ 382/100; 348/461

(58) Field of Classification Search .................. 382/100, 382/232; 348/461, 465, 467; 380/210; 713/176
See application file for complete search history.

(56) References Cited

U.S. PATENT DOCUMENTS

| 4,237,484 | A |   | 12/1980 | Brown et al. ................. 358/142 |
|-----------|---|---|---------|---------------------------------------|
| 4,939,515 | A |   | 7/1990  | Adelson ......................... 341/51 |
| 5,010,405 | A |   | 4/1991  | Schreiber et al. ............. 358/141 |
| 5,134,496 | A | * | 7/1992  | Schwab et al. ................ 358/335 |
| 5,319,453 | A | * | 6/1994  | Copriviza et al. ................. 346/6 |
| 5,636,292 | A |   | 6/1997  | Rhoads ......................... 382/232 |
| 5,663,766 | A |   | 9/1997  | Sizer, II ....................... 348/473 |
| 5,809,139 | A |   | 9/1998  | Girod et al. ....................... 380/5 |
| 5,809,160 | A |   | 9/1998  | Powell et al. ................. 382/100 |
| 5,901,178 | A |   | 5/1999  | Lee et al. ...................... 375/240 |
| 5,960,081 | A |   | 9/1999  | Vynne et al. ................... 380/10 |

(Continued)

FOREIGN PATENT DOCUMENTS

JP 05-236424 A 8/1993

OTHER PUBLICATIONS

Szepanski, "Binärdatenübertragung über Videokanäle mit Datensignalen sehr geringer Amplitude," Fernseh- und Kino-Technik, vol. 32, No. 7, 1978, pp. 251-256 (with English translation attached).*

(Continued)

*Primary Examiner* — Andrew W Johns

(57) ABSTRACT

Methods for embedding data, such as digital watermarks, in video objects segmented from video frames. Watermarks are embedded such that they move with the object in the video frames. Interframe motion of video objects is estimated and used to modify the watermark accordingly. Methods for detecting embedded data from video objects are also disclosed.

9 Claims, 3 Drawing Sheets

U.S. PATENT DOCUMENTS

| | | | |
|---|---|---|---|
| 6,131,161 | A | 10/2000 | Linnartz .................. 713/176 |
| 6,181,802 | B1 | 1/2001 | Todd ........................ 382/100 |
| 6,226,387 | B1 | 5/2001 | Tewfik et al. ............. 382/100 |
| 6,282,299 | B1 | 8/2001 | Tewfik et al. ............. 382/100 |

OTHER PUBLICATIONS

Szepanki, "Additive Binärdatenübertragung für Videosignale," NTG-Fachberichte, vol. 74, 1980, pp. 343-351 (with English translation attached).*

Matusi et al., "Video-Steganography: How to Secretly Embed a Signature in a Picture," IMA Intellectual Property Project Proceedings, vol. 1, No. 1, Jan. 1994, pp. 187-205.*

Translation of JP 05-236424 A (publ. Sep. 20, 1993).*

Hartung, et al. "Digital Watermarking of Raw and Compressed Video," Proc. SPIE 2952, Digital Compression Technologies and Systems for Video Communications, Oct. 1996, pp. 205-213.

J. Nam and A. H. Tewfik, "Combined Audio and Visual Streams Analysis for Video Sequence Segmentation," in Proceedings of the 1999 International Conference on Acoustics, Speech and Signal Processings, (Munich, Germany), pp. 2665-2668 (Apr. 1997).

Bouman, C., et al., "Multiple Resolution Segmentation of Textures Images", IEEE Transactions on Pattern Analysis and Machine Intelligence, 13, 99-113 (Feb. 1991).

Chalom, E., et al., "Segmentation of an Image Sequence Using Multi-Dimensional Image Attributes", Proceedings of the 1996 IEEE International Conference on Image Processing, vol. II, Lausanne, Switzerland, 525-528 (Sep. 16-19, 1996).

Chang, S.-F., "Compressed-Domain Techniques for Image/Video Indexing and Manipulation", Proceeding for the 1995 IEEE International Conference on Image Processing, vol. 1, Washington, D.C., 314-317 (Oct. 23-26, 1995).

Chang, S.-F., et al., "Transform Coding of Arbitrarily-Shaped Image Segments", Proceedings of the ACM, Multimedia 93, Anaheim, CA, 83-90 (Aug. 1-6, 1993).

* cited by examiner

EMBEDDING DATA IN AND DETECTING EMBEDDED DATA FROM VIDEO OBJECTS

RELATED APPLICATION DATA

This application is a continuation in part of U.S. patent application Ser. No. 10/360,794, filed Apr. 30, 2001, which is a continuation-in-part of application Ser. No. 08/921,931, filed Aug. 27, 1997 (now U.S. Pat. No. 6,226,387), which claims priority to provisional application 60/050,587, filed Jun. 24, 1997.

U.S. patent application Ser. No. 10/360,794 is also a continuation-in-part of application Ser. No. 08/918,126, filed Aug. 27, 1997 (now U.S. Pat. No. 6,272,634), which claims priority to provisional application 60/050,587, filed Jun. 24, 1997.

U.S. patent application Ser. No. 10/360,794 is also a continuation-in-part of application Ser. No. 08/918,125, filed Aug. 27, 1997 (now U.S. Pat. No. 6,282,299), which claims priority to provisional application 60/050,587, filed Jun. 24, 1997.

The above applications and patents are incorporated by reference.

GOVERNMENT RIGHTS STATEMENT

The inventions detailed in this application was made with government support by AFOSR under grant AF/F49620-94-1-0461, NSF under grant NSF/INT-9406954 and ARPA GRANT No. AF/F49620-93-1-0558. The Government has certain rights in this invention.

FIELD OF THE INVENTION

This invention relates generally to techniques for embedding data such as watermarks, signatures and captions in digital data, and more particularly to watermarks in digital data that relates to video.

BACKGROUND OF THE INVENTION

Digital video is readily reproduced and distributed over information networks. However, these attractive properties lead to problems enforcing copyright protection. As a result, creators and distributors of digital video are hesitant to provide access to their digital intellectual property. Digital watermarking has been proposed as a means to identify the owner and distribution path of digital data. Digital watermarks address this issue by embedding owner identification directly into the digital data itself. The information is embedded by making small modifications to the pixels in each video frame. When the ownership of a video is in question, the information can be extracted to completely characterize the owner or distributor of the data.

Video watermarking introduces issues that generally do not have a counterpart in images and audio. Video signals are highly redundant by nature, with many frames visually similar to each other. Due to large amounts of data and inherent redundancy between frames, video signals are highly susceptible to pirate attacks, including frame averaging, frame dropping, interpolation, statistical analysis, etc. Many of these attacks may be accomplished with little damage to the video signal. A video watermark must handle such attacks. Furthermore, it should identify any image created from one or more frames in the video.

Furthermore, to be useful, a watermark must be perceptually invisible, statistically undetectable, robust to distortions applied to the host video, and able to resolve multiple ownership claims. Some watermarking techniques modify spatial/temporal data samples, while others modify transform coefficients. A particular problem afflicting all prior art techniques, however, is the resolution of rightful ownership of digital data when multiple ownership claims are made, i.e., the deadlock problem. Watermarking schemes that do not use the original data set to detect the watermark are most vulnerable to deadlock. A pirate simply adds his or her watermark to the watermarked data. It is then impossible to establish who watermarked the data first.

Watermarking procedures that require the original data set for watermark detection also suffer from deadlocks. In such schemes, a party other than the owner may counterfeit a watermark by "subtracting off" a second watermark from the publicly available data and claim the result to be his or her original. This second watermark allows the pirate to claim copyright ownership since he or she can show that both the publicly available data and the original of the rightful owner contain a copy of their counterfeit watermark.

There is a need, therefore, for watermarking procedures applicable to video digital data that do not suffer from the described shortcomings, disadvantages and problems.

SUMMARY OF THE INVENTION

One aspect of the invention is a method of embedding data into video. The method receives video frames that including video objects. At least one of the video objects is segmented from the video frames, and typically, the frames include two more segmented video objects. The method embeds data into the at least one video object, and combines the video objects, including the at least one video object with embedded data, into video frames to produce a video stream.

Another aspect of the invention is a method of embedding a watermark into video. The method receives video frames, including at least one video object that has been segmented from the video frames. It also receives motion parameters that define motion of the video object in the video frames. The method embeds a watermark in the video object in plural frames, and it uses the motion parameters so that location of the watermark in the video frames corresponds to motion of the video object.

Another aspect of the invention is a method of detecting embedded data in video frames. The method identifies at least one video object in the video frames, including motion parameters describing motion of the video object in the video frames. It provides a watermark key corresponding to a watermark embedded in the object, and uses the watermark key to detect the watermark embedded in the video object.

In one embodiment, discrete objects are extracted from video host data that is made up of a number of successive frames. Each object is assigned and embedded with a watermark. The watermark is embedded by generating the watermark, applying it to a perceptual (frequency) mask of the block, spatially (non-frequency) masking the resulting block, and re-adding the block to that spatially masked result. The objects are collected into a database so that an object may be tracked as it is transformed from frame to frame of the video host data. A unique watermark generation routine is also described that assists in the resolution of deadlock.

This approach provides advantages over the approaches found in the prior art. In the prior art, an independent watermark applied to each frame may result in detection of the watermark by statistically comparing or averaging similar regions and objects in successive video frames, as has been described in the background. However, the inventive object-based approach addresses this issue by embedding watermarks in objects that persist across frames. That is, the same watermark is embedded in the object, as that object exists from frame to frame. Therefore, statistical comparison or averaging does not yield the watermark.

Further aspects, advantages and embodiments of the invention will become apparent by reference to the drawings, and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Overview of the Watermarking Process

Figure 1:
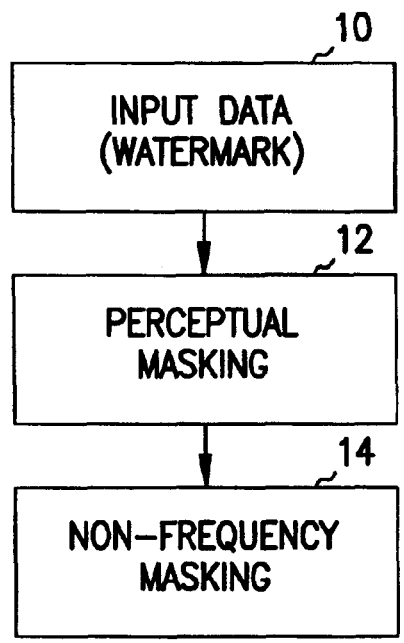
FIG. 1 is a flowchart of a method of a video watermarking process according to an embodiment.

Referring to FIG. 1, a flowchart of a method of a video watermarking process, according to one embodiment of the invention, is shown. Specifically, the method of FIG. 1 imbeds watermark data into host video data. The method of FIG. 1 is particularly used as to each defined object of the host video data, as that object persists across different frames of the video, as will be described in a following section. In step 10, the watermark data is generated, which is the signature, or watermark, that acts as a unique identifier for the host video data. Note that the signature inherently is spread across the frequency spectrum without explicit spread-spectrum processing.

In one embodiment of the invention, the signature is a pseudo-random sequence, which is created using a pseudo-random generator and two keys. With the two proper keys, the watermark may be extracted. Without the two keys, the data hidden in the video is statistically invisible and impossible to recover. Pseudo-random generators are well within the art. For example, the reference R. Rivest, "Cryptography," in Handbook of Theoretical Computer Science (J. van Leeuwen, ed.), vol. 1, ch. 13, pp. 717-755, Cambridge, Mass.: MIT Press, 1990, which is hereby incorporated by reference, describes such generators.

In one embodiment, the creation of the watermark data in step 10 works as follows. The author has two random keys $x1$ and $x2$ (i.e., seeds) from which the pseudo-random sequence y can be generated using a suitable cryptographic operator $g(x1,x2)$, as known within the art. The noise-like sequence y, after some processing, is the actual watermark hidden into the video stream. The key $x1$ is author dependent. The key $x2$ is signal dependent. In particular, $x1$ is the secret key assigned to (or chosen by) the author. Key $x2$ is computed from the video signal which the author wishes to watermark. The signal dependent key is computed from the masking values of the original signal. The masking values give us tolerable error levels in the host video signal. The tolerable error levels are then hashed to a key $x2$.

The operator $g( )$ is called a pseudo-random sequence generator. For the pseudo-random generator to be useful, a pirate must not be able to predict bits of y or infer the keys $x1$ or $x2$ from knowledge of some bits of y. There are several popular generators that satisfy these properties, including RSA, Rabin, Blum/Micali, and Blum/Blum/Shub, as known within the art. For example, the Blum/Blum/Shub pseudo-random generator uses the one way function $y=g(x)=x*x$ mod n, where $n=pq$ for primes p and q so that $p=q=3$ mod 4. It can be shown that generating x or y from partial knowledge of y is computationally infeasible for the Blum/Blum/Shub generator. The classical maximal length pseudo noise sequence (i.e., m-sequence) generated by linear feedback shift registers are not used for this purpose. Sequences generated by shift registers are cryptographically insecure, as one can solve for the feedback pattern (i.e., the keys) given a small number of output bits y.

Thus, a pirate is not free to subtract off a second watermark y' arbitrarily. The pirate must supply the keys $x1'$ and $x2'$ which generate the watermark y' they wish to embed. It is computationally infeasible to invert the one-way function $y'=g(x1',x2')$ to obtain $x1'$ and $x2'$. Furthermore, $x2'$ is not arbitrary. It is computed directly from the original video signal, which is inaccessible to the pirate. As a result, the two-key pseudo-random sequence author representation resolves the deadlock problem.

In step 12, the data generated by step 10 is imbedded into a perceptual mask of the host video data. This embodiment employs perceptual masking models to determine the optimal locations within host data in which to insert the watermark. The perceptual mask is specific to video host data. The mask provides for the watermark data generated by step 10 to be embedded with the host data, at places typically imperceptible to the human eye. That is, the perceptual mask exploits masking properties of the human visual system. Step 12 embeds the watermark within the host data such that they will not be perceived by a human eye, as defined by the perceptual model. The perceptual masking of step 12 is conducted in the frequency domain.

Thus, image masking models based on the human visual system (HVS) are used to ensure that the watermark embedded into each video frame is perceptually invisible and robust. Visual masking refers to a situation where a signal raises the visual threshold for other signals around it. Masking characteristics are used in high quality low bit rate coding algorithms to further reduce bit rates. The masking models presented here are based on image models.

The masking models give the perceptual tolerance for image coefficients and transform coefficients. These masking models are also described in the reference B. Zhu, et al., "Low Bit Rate Near-Transparent Image Coding," in Proc. of the SPIE Int'l Conf. on Wavelet Apps. for Dual Use, vol. 2491, (Orlando, Fla.), pp. 173-184, 1995, which is hereby incorporated by reference, and in the reference B. Zhu, et al., "Image Coding with Mixed Representations and Visual Masking," in Proc. 1995 IEEE Int'l Conf. on Acoustics, Speech and Signal Processing, (Detroit, Mich.), pp. 2327-2330, 1995, which is also hereby incorporated by reference. The frequency masking model is based on the knowledge that a masking grating raises the visual threshold for signal gratings around the masking frequency. The model is based on the discrete cosine transform (DCT), expresses the contrast threshold at frequency f as a function of f, the masking frequency Em and the masking contrast cm:

$$c(f,f_{in}) = c_o(f) \cdot \text{Max}\{1, [f(f)f_{in})c_{in}]^0\},$$

where co(f) is the detection threshold at frequency f. To find the contrast threshold c(f) at a frequency f in an image, the DCT is first used to transform the image into the frequency domain and find the contrast at each frequency. Then, a summation rule of the form $$c(f) = [\Sigma f_{in} c(f,f_{in})]^{1/\beta},$$

is used to sum up the masking effects from all the masking signals near f. If the contrast error at f is less than c(f), the model predicts that the error is invisible to human eyes.

In step 14, the host video data, with the imbedded watermark data, from step 12 is further subject to a non-frequency mask. Because the perceptual mask in step 12 is a frequency domain mask, a further mask is necessary to ensure that the embedded data remains invisible in the host video data. The non-frequency mask is a spatial mask.

Frequency masking effects are localized in the frequency domain, while spatial masking effects are localized in the spatial domain. Spatial masking refers to the situation that an edge raises the perceptual threshold around it. Any model for spatial masking can be used, and such models are well known in the art. However, the model used in one embodiment is similar to the model described in the Zhu, "Low Bit Rate . . . " reference previously incorporated by referenced, and which is itself based on a model proposed by Girod in "The Information Theoretical Significance of Spatial and Temporal Masking in Video Signals," in Proceedings of the SPIE Human Vision, Visual Processing, and Digital Display, vol. 1077, pp. 178-187 (1989), which is also herein incorporated by reference.

In one embodiment the upper channel of Girod's model is linearized under the assumption of small perceptual errors, the model giving the tolerable error level for each pixel in the image, as those skilled in the art can appreciate. Furthermore, under certain simplifying assumptions described in the Zhu "Bit Rate . . . " reference, the tolerable error level for a pixel p(x,y) can be obtained by first computing the contrast saturation at (x,y)

$$dc_{sat}(x,y) = dc_{sat} \sqrt{\frac{T}{\sum_{x',y'} w_4(0,0,x',y')}}$$

where the weight $w_4(x,y,x',y')$ is a Gaussian centered at the point (x,y) and T is a visual test based threshold. Once $dc_{sat}$ (x,y) is computed, the luminance on the retina, $dl_{ret}$, is obtained from the equation $$dc_{sur}(x,y) = w_2(x,y) \cdot dl_{ret}(x,y)$$

From $dl_{ret}$, the tolerable error level ds(x,y) for the pixel p(x,y) is computed from The weights $w_1(x,y)$ and $w_2(x,y)$ are based on Girod's model. The masking model predicts that changes to pixel p(x,y) less than ds(x,y) introduce no perceptible distortion.

As have been described, steps 10, 12 and 14 of FIG. 1 provide an overview of the video watermarking process. An overview of the object-based video watermarking process is now described.

Overview of the Object-Based Video Watermarking Process

Figure 2:
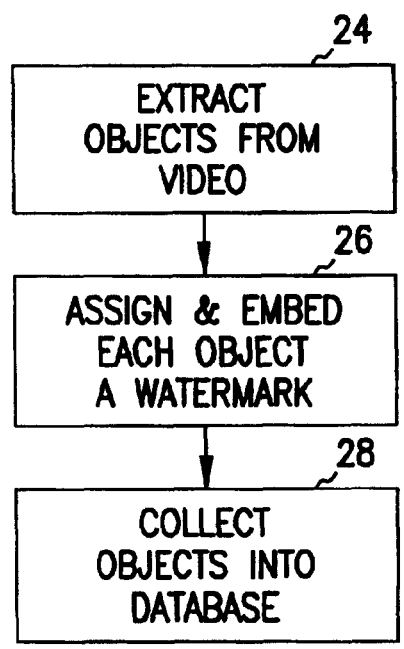
FIG. 2 is a flowchart of a method of an object-based video watermarking process according to an embodiment.

Referring to FIG. 2, a flowchart of a method of an object-based video watermarking process, according to one embodiment, is shown. The method utilizes the watermarking method of FIG. 1 already described. In step 24, a segmentation algorithm to extract objects from the host video data. The invention is not limited to a particular segmentation algorithm. Such segmentation algorithms are known in the art. For example, in one embodiment, the algorithm described in the reference E. Chalom and V. M. Bove, Jr., "Segmentation of an Image Sequence Using Multi-Dimensional Image Attributes," in Proc. 1996 IEEE Int'l Conf. on Image Processing, (Lausanne, Switzerland), pp. 525-528, 1996, which is hereby incorporated by reference, is used.

In step 26, each segmented object is embedded with a unique watermark according its perceptual characteristics. In particular, each object in the video has an associated watermark. As the object experiences translations and transformations over time, the watermark remains embedded with it. An interframe transformation of the object is estimated and used to modify the watermark accordingly. If the object is modified too much, or if the watermark exceeds the TEL of the object pixels, a new object and new watermark are defined.

In step 28, objects defined in the video are collected into an object database. As new frames are processed, segmented objects may be compared with previously defined objects for similarity. Objects which appear visually similar use the same watermark (subject to small modifications according to affine transformations). As a result, the watermark for each frame changes according to the perceptual characteristics while simultaneously protecting objects against statistical analysis and averaging.

The object-based video watermarking method has several other advantages. As it is object based, the algorithm may be easily incorporated into the MPEG-4 object-based coding framework, which is known within the art. In addition, the detection algorithm does not require information regarding the location (i.e., index) of the test frames in the video. Objects are simply identified in the test frames. Once objects are identified, their watermarks may be retrieved from the database and used to determine ownership.

A simplified block-based (MPEG) approach to the object watermarking method may be implemented. Rather than watermarking true objects with irregular boundaries, rectangular blocks are watermarked using a modified form of MPEG motion tracking. Specifically, frame-by-frame block tracking is performed in terms of translation, rotation, and scaling between the current reference block and candidate blocks in the next frame. Given a block in the current frame, an affine transformation vector is obtained by minimizing a cost function measuring the mismatch between the block and each predictor candidate.

Furthermore, the range of predictor candidates are limited by scale, rotation, and translation. The error corresponding to the best matching candidate is compared to a similarity threshold. Candidate blocks with mismatches less than the threshold are signed with identical watermarks. This MPEG approach is utilized in the specific implementation that will be shown in and described in conjunction with FIG. 4.

As have been described, steps 24, 26, and 28 of FIG. 2 provide an overview of the object-based watermarking process. The specifics of a hardware implementation are now provided.

Hardware Implementation

Figure 3:
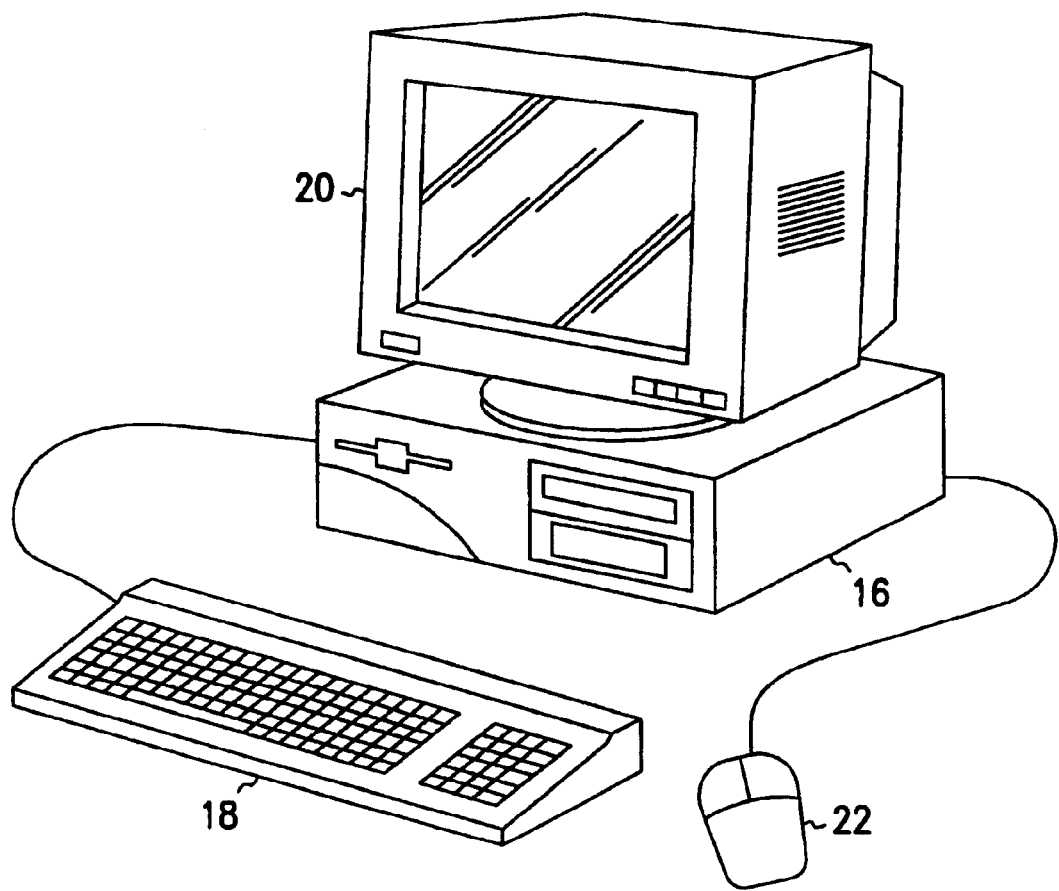
FIG. 3 is a diagram of a typical computer to be used with embodiments.

The invention is not limited as to the type of computer on which it runs. However, a typical example of such a computer is shown in FIG. 3. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 3 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the invention is typically written in a language such as C, although the invention is not so limited.

The specifics of the hardware implementation have been described. A particular implementation of object-based video watermarking, based on the methods of FIG. 1 and FIG. 2, is now described.

Particular Implementation of Object-Based Video Watermarking

Figure 4:
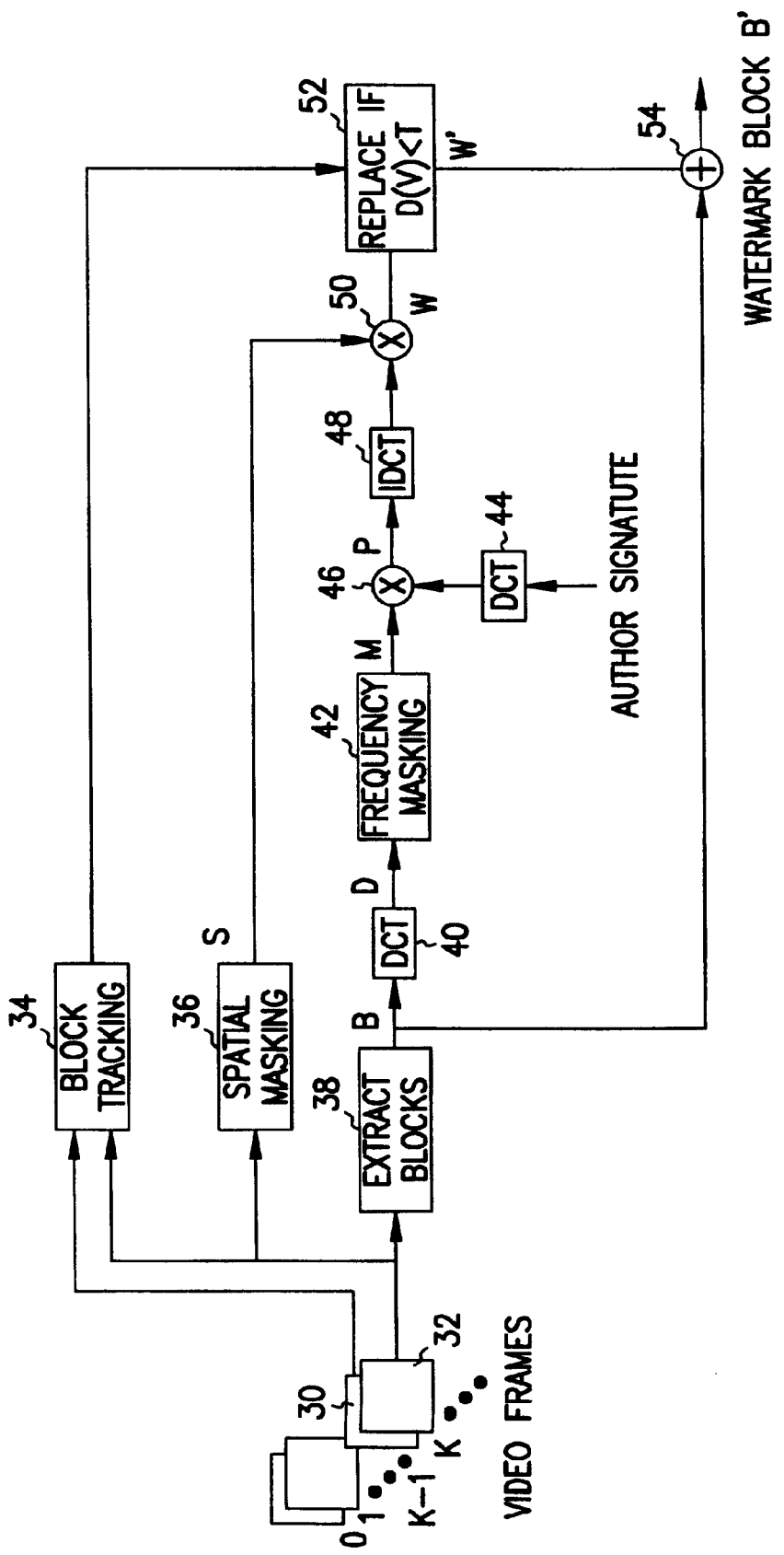
FIG. 4 is a block diagram of a specific implementation of object-based video watermarking, based on the methods of FIG. 1 and FIG. 2, according to an embodiment.

The embodiment shown in FIG. 4 illustrates a particular implementation of object-based video watermarking, as based on the methods of FIG. 1 and FIG. 2 that have already been described. Referring now to FIG. 4, a block diagram of this specific implementation of object-based video watermarking is shown. A video frame k 32 is input into step 34 along with video frame k−1 30 (i.e., the video frame immediately preceding frame k 32. Video frame k 32 is also input into steps 36 and 38. The host video data is made up of a number of such frames.

In step 34, the individual blocks (that is, objects) between the two video frames are compared so that they may be tracked. The block-tracking algorithm used in one embodiment is that which has already been described in conjunction with FIG. 2, although the invention is not so limited. Specifically, it is a simplified MPEG block-based approach, using rectangular blocks in a modified form of MPEG motion tracking. Frame-by-frame block tracking is performed in terms of translation, rotation, and scaling between in the current reference block from frame k−1 30 and candidate blocks in the frame k 32. Given a block in the frame k−1 30, an affine transformation vector is obtained by minimizing a cost function measuring the mismatch between the block and each predictor candidate. The range of predictor candidates is limited by scale, rotation, and translation.

In step 36, the spatial masking value S for frame k 32 is computed. The spatial masking value S will be introduced into the frequency mask later to verify that the watermark designed with the frequency masking model is invisible for local spatial regions. The invention is not limited to any particular spatial mask. One particular spatial mask for video host data is that which has already been described in conjunction with FIG. 1. Each watermark coefficient may also be compared with the tolerable error level obtained to assure that it is invisible.

In step 38, the image data within frame k 32 is segmented into blocks. The invention is not limited to any particular manner by which the data is segmented. In one embodiment, the image data is segmented as has already been described in conjunction with FIG. 2. Using a traditional approach, the blocks may be n.times.n (e.g., 8.times.8 like JPEG). An option at this stage is to segment the image data of the frame into blocks of objects and texture regions, or square blocks of data. Blocking the image adds detection robustneses to cropping and localized signal processing.

In step 40, a discrete cosine transform (DCT) is applied to each block B of the frame k 32, to obtain the DCT coefficients D of the blocks B. This transforms the data into the frequency domain, where perceptual masking is conducted. In step 42, a perceptual frequency mask is computed for each block. The perceptual mask takes into account the human visual system so that the watermark is embedded within the host data in a manner that makes the watermark invisible within the host data. The invention is not limited to any particular perceptual mask; however, the frequency mask described in conjunction with FIG. 1 may be used. Note that segmenting the frame into blocks ensures that the frequency masking estimates are localized.

In step 44, the unique signature, or watermark, for each block, is also transformed into the frequency domain by DCT. The signature can be of any type, such as that has been described in conjunction with FIG. 1, a pseudo-noise (PN) code, etc. In particular, the signature may be a type of PN code known as an m-sequence. Note that a different signature sequence is used for each image block B. In step 46, the resulting mask of step 42 of the image block B is scaled (multiplied) into the DCT of the signature for the image block resulting from step 44, to obtain the product P. The resulting signature-laden block is then transformed back to the time domain via an inverse DCT (IDCT) in step 48. In step 50, the spatial masking values S for the frame k resulting from step 36 is then scaled (multiplied) into the IDCT'ed block resulting from step 48, to obtain block W.

In step 52, the watermark for a block in the current frame k 32 is replaced with the watermark for the block from the previous frame k−1 30 if the distortion D(V) is less than a threshold T. That is, the error corresponding to the best matching candidate from step 34 for each block B is compared to a similarity threshold T. Candidate blocks with mismatches less than the threshold T are signed with identical watermarks (from the block B in frame k−1 30). The result from step 52 is block W'. Finally, in step 54, the watermarked mask resulting from the previous steps (most immediately step 52) is added to the corresponding extracted block B resulting from step 38, to obtain block B'. The watermarked frame is then obtained by assembling the blocks of each frame.

The watermarks embedded within the video data according to the method of FIG. 4 should be extractable even if common signal processing operations are applied to the host data. This is particularly true in the case of deliberate unauthorized attempts to remove the watermark. For example, a pirate may attempt to add noise, filter, code, re-scale, etc., the host data in an attempt to destroy the watermark. The embedded watermark, however, is noise-like and its location over multiplied blocks of the host data, over successive frames of the data, is unknown. Therefore, the pirate has insufficient knowledge to directly remove the watermark. Furthermore, a different signature is used for each block to further reduce unauthorized watermark removal by cross correlation. Any destruction attempts are done blindly.

Detection of the watermark is accomplished via generalized likelihood ratio test. For a frame or object R in the potentially pirated video sequence, the hypothesis test $H0: X = R − F = N$(no watermark)

$H1: X = R − F = W' + N$(watermark)

is performed. Here F may be an original frame closest to R or may be a composite frame of objects from the object database. In the case when R is an object, F is the corresponding object from the object database. The term W' is the potentially modified watermark, and N is noise. The hypothesis decision is obtained by measuring the similarity between the extracted signal X and original watermark W of F: $Sim(X,W) = X'*W/(W*W)$, and comparing with a threshold. Similarity greater than a minimum threshold indicates the presence of the owner's watermark (and copyright).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A method of embedding data into video, the method comprising:
    receiving video frames including video objects, wherein at least one of the video objects is segmented from the video frames;
    embedding data into the at least one video object; and
    combining the video objects, including the at least one video object with embedded data, into video frames to produce a video stream including the at least one video object separately embedded with data.

2. The method of claim 1 wherein interframe motion of the segmented video object is estimated and used to modify the embedded data in different video frames.

3. The method of claim 1 wherein the at least one video object has corresponding motion parameters that define the motion of the video object relative to at least a first frame.

4. The method of claim 3 wherein the video object is segmented into blocks and the blocks have corresponding motion parameters.

5. The method of claim 1 including computing distortion associated with re-inserting a watermark for a video object from a previous frame into the video object for a current frame, and embedding the watermark from the previous frame into the video object for the current frame when the distortion is below a predetermined threshold.

6. The method of claim 1 wherein unique watermarks are embedded in different video objects segmented from the video frames.

7. The method of claim 1 including estimating interframe motion.

8. A method of embedding a watermark into video, the method comprising;
    receiving video frames, including at least one video object that has been segmented from the video frames;
    receiving motion parameters that define motion of the video object in the video frames;
    embedding a watermark in the video object in plural frames, including using the motion parameters so that location of the watermark in the video frames corresponds to motion of the video object.

9. The method of claim 8 including computing the watermark as function of a frequency domain transform of the video object in the frames.

* * * * *